United States Patent [19]
Giuffre'

[11] Patent Number: 6,017,066
[45] Date of Patent: Jan. 25, 2000

[54] THREADED CONNECTION DEVICE FOR PIPES

[75] Inventor: Carmelo Giuffre', Capo D'Orlando, Italy

[73] Assignee: Irritec S.r.l., Messina, Italy

[21] Appl. No.: 09/078,433

[22] Filed: May 14, 1998

[30] Foreign Application Priority Data

May 14, 1997 [IT] Italy ............................... GE97 A 0044

[51] Int. Cl.[7] ........................................... F16L 35/00
[52] U.S. Cl. ................. 285/38; 285/41; 285/92; 285/247; 285/391; 285/423
[58] Field of Search ..................... 285/246, 247, 285/92, 38, 391, 41, 423

[56] References Cited

U.S. PATENT DOCUMENTS

| | | | |
|---|---|---|---|
| 1,993,257 | 3/1935 | Bettis | 285/391 X |
| 2,454,557 | 11/1948 | Jacobson | 285/92 |
| 2,587,544 | 2/1952 | Sneddon | 285/391 X |
| 3,843,169 | 10/1974 | Wise | 285/247 X |
| 4,046,479 | 9/1977 | Paley | 285/391 X |
| 5,240,291 | 8/1993 | Zornow | 285/92 X |
| 5,388,871 | 2/1995 | Saitoh | 285/247 |

FOREIGN PATENT DOCUMENTS

| | | | |
|---|---|---|---|
| 215592 | 9/1956 | Australia | 285/92 |
| 731198 | 8/1932 | France . | |
| 325031 | 4/1936 | Italy | 285/247 |
| 159 999 | 2/1933 | Switzerland . | |
| WO 84/02760 | 7/1984 | WIPO . | |

*Primary Examiner*—Dave W. Arola
*Attorney, Agent, or Firm*—Larson & Taylor

[57] ABSTRACT

Threaded connection device for pipes including a cylindrical sleeve having, at both its ends, fasteners for the connection with a flexible pipe, two internally threaded rings each one screwing on one end of the sleeve. These said rings have a circular rim for the seaming and the compression of the pipe around the sleeve fasteners. The sleeve, in connection with the ring thread, has a thread part having a pitch multiple as to the thread pitch of the ring itself.

11 Claims, 3 Drawing Sheets

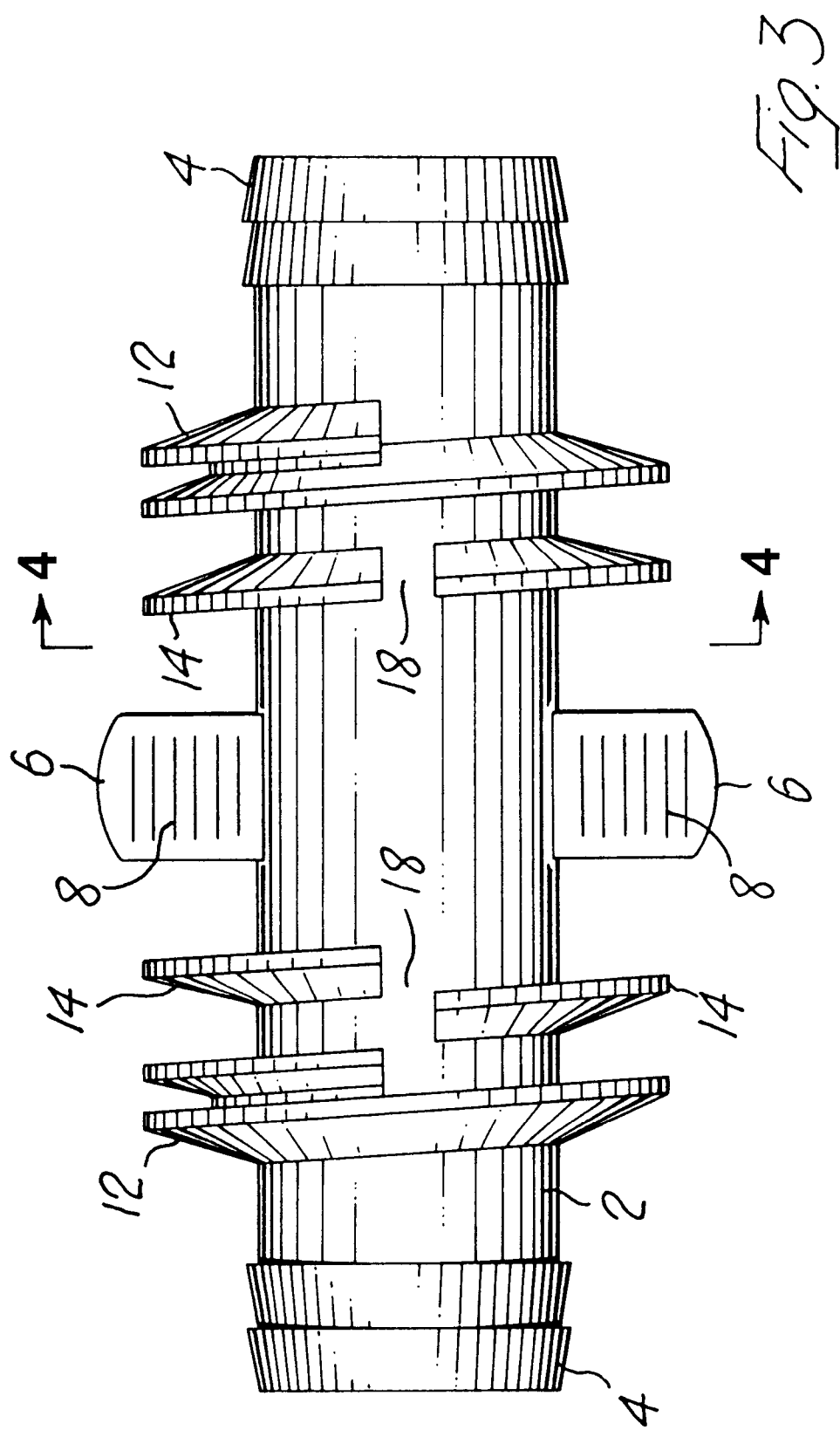

THREADED CONNECTION DEVICE FOR PIPES

TECHNICAL FIELD OF THE INVENTION

The present invention relates to a threaded connection device for pipes. In particular, the present invention relates to a device, as said above, allowing to reduce the internal tension due to the connection itself and the production costs of the nipple.

BACKGROUND OF THE INVENTION

It is known that in the pipe nipples of the typical sleeve-ring type it is noticed a great increase of the sleeve diameter near the thread because of the necessity to seam with the same ring variable thickness pipes.

Such a necessity causes a rise of the production costs of the nipple because of a great increase of the pressing times and of the amount of material used for the molding of the nipple itself.

SUMMARY OF THE INVENTION

A goal of the present invention is to obviate the above-mentioned disadvantages.

More particularly, a goal of the present invention is to make a threaded connection device for pipes allowing to reduce the amount of material required to make the connection itself.

A further goal of the present invention is to propose a threaded connection device for pipes allowing to reduce the internal tensions during its making, due to a more uniform cooling due to a better distribution of the thickness in the threaded part.

A further goal of the present invention is to propose a threaded connection device for pipes being characterised by great resistance and reliability in time, easy and inexpensive to make.

These and other goals mentioned later on are reached by the threaded connection device for pipes, subject of the present invention, including a cylindrical sleeve having, at both its ends, fasteners for the connection with a flexible pipe, at least one internally threaded ring screwing on at least one end of the sleeve, said ring having a circular rim for the seaming and the compression of the pipe around the above mentioned sleeve fasteners, characterised in that said sleeve has, in connection with the ring thread, a threaded part having a pitch multiple as to the pitch of the thread of the ring itself.

BRIEF DESCRIPTION OF THE DRAWINGS

These and further characteristics of the threaded connection device for pipes will be better underlined in the following detailed description, which relates to the figures of the enclosed drawings representing a preferred realization form and an alternative one, illustrative, but not restrictive, of the invention itself, where:

FIG. 3 schematically shows in side view the threaded connection device for pipes of FIG. 1 without the connection rings at the pipes according to the present invention.

DESCRIPTION OF SOME PREFERRED EMBODIMENTS OF THE INVENTION

Figure 1:
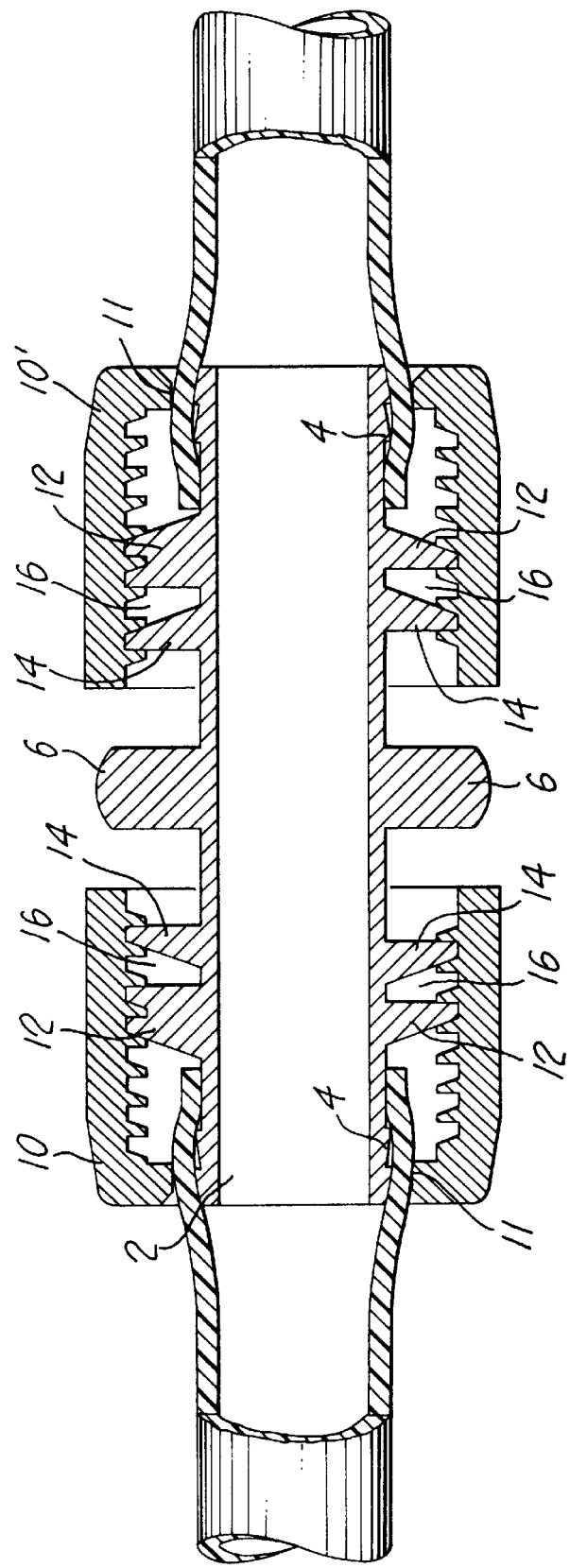
FIG. 1 schematically shows in longitudinal section the threaded connection device for pipes according to a preferred realization form of the present invention.
Figure 2:
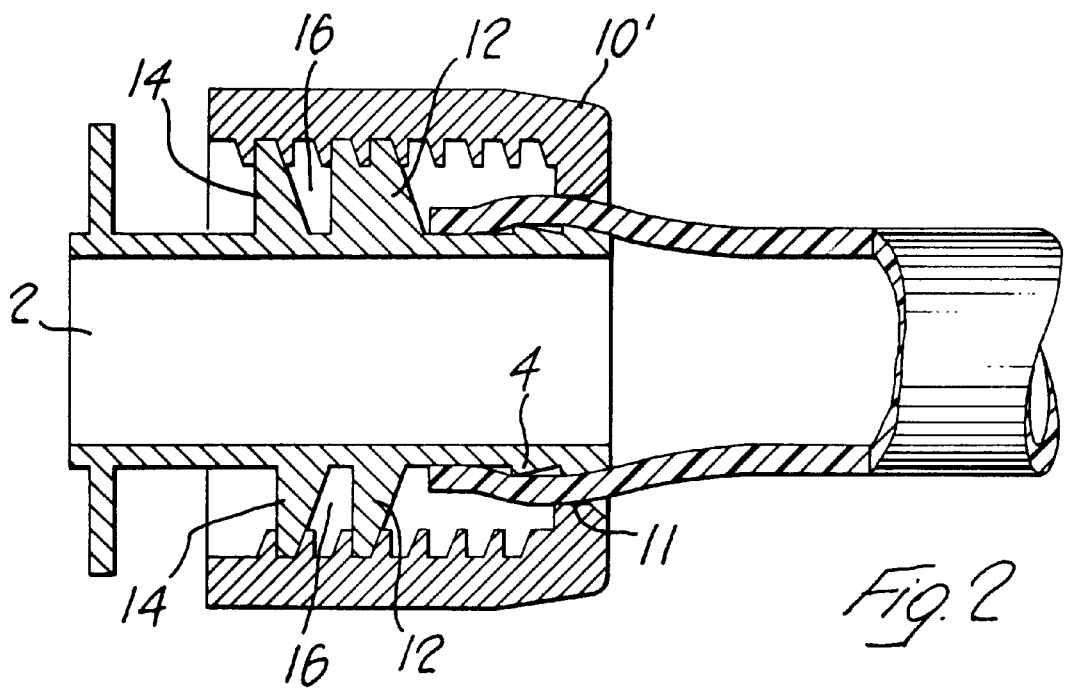
FIG. 2 schematically shows in longitudinal section the threaded connection device for pipes according to an alternative realization form of the present invention.
Figure 4:
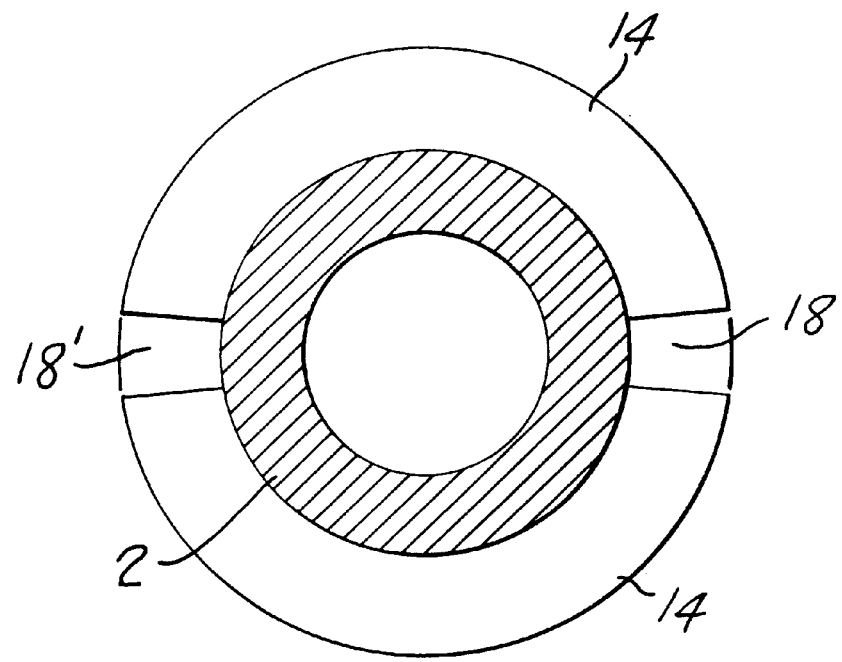
FIG. 4 schematically shows in cross section along the line 4—4 of FIG. 3 the same connection device for pipes.

Referring to the mentioned figures, the connection device for pipes according to the present invention includes a cylindrical sleeve 2 having, at one end for the embodiment of FIG. 2 and at both its ends for the embodiment of FIGS. 1 and 3–4, fasteners 4 for the connection with a flexible pipe and, in its central part, a pair of opposing tongues 6 both provided with a plurality of knurlings 8 to make their hold easier during the manual rotation.

The device includes, moreover, an internally threaded ring 10 screwing on one end of the sleeve 2 and a second one 10', same to the first, screwing on the opposite end of the same sleeve. Both rings co-operate with the sleeve for the locking of the pipe and, in order to do that, have a circular rim 11 for the compression of the pipe around the mentioned fasteners 4 of the sleeve 2.

According to the present invention, the sleeve 2, in connection with both the threads of the rings 10 and 10', has a first part of thread 12 placed along an helical line and a second part of thread 14 placed on the same helical line substantially along the extension of the first part. The two threads 12 and 14 are divided by at least one threadless part and correspond to an angle from 1° to 360°. Said parts of thread 12 and 14 are divided by a threadless part 16 so that together threads 12 and 14 have a thread pitch double that of the threads of rings 10 and 10'. Moreover, the threaded parts 12 and 14 have two longitudinal opposing grooves 18 18' passing through the threads.

From the preceding detailed structural description of the device subject of the present invention, it becomes clear its functioning and use. The end of a generical pipe is at first introduced in the ring 10 or 10' and restrained to the sleeve 2 through the fasteners 4. In a second time the ring itself is screwed on the sleeve, by means of the mentioned threads, and its circular rim 11 allows the compression of the pipe end around the mentioned fasteners 4 of the sleeve 2, this way steadily joining the pipe to the sleeve itself.

From the preceding detailed description of the structural and functioning characteristics of the device subject of the present invention, are better underlined the advantages mentioned above. In fact, the sleeve discontinuous threading allows the reduction of the amount of material required to mold the nipple itself. To the same goal are made the said longitudinal grooves allowing to save plastic material during the molding of the connection.

The invention, as described and later on claimed, has been however proposed with mere illustrative purpose, being understood that the same could be susceptible of many modifications or variations, in any case all within the invention concept.

It is, at last, to be understood possible eventual structural reversal or alternative dislocations of the components altogether constituting the device subject of the present invention.

What I claim is:

1. A threaded connection device for a flexible pipe comprising:
   a cylindrical sleeve having a fastener at one end to which a flexible pipe is attached and an external thread adjacent said fastener;
   a ring for the one end of said sleeve, said ring including a circular rim, and an internal thread for threading said ring onto the external thread of said sleeve and over the respective pipe and said fastener thereat such that said circular rim compresses the pipe against said fastener; and wherein said external thread of said sleeve further includes a thread part having a thread pitch which is a multiple of a thread pitch of said internal thread of said ring.

2. A threaded connection device as claimed in claim 1, wherein said thread part of external thread of said sleeve has a thread pitch which is double the thread pitch of said internal thread of said ring.

3. A threaded connection device as claimed in claim 1, wherein said external thread of said sleeve is formed by a first threaded portion placed along a helical line and a second threaded portion placed substantially along the helical line, said first threaded portion and said second threaded portion being divided by at least one threadless portion extending along the helical line for an angle of between 1° and 360°.

4. A threaded connection device as claimed in claim 1, wherein said thread part includes a longitudinal groove therethrough.

5. A threaded connection device as claimed in claim 4, wherein said thread part includes two longitudinal grooves therethrough which are opposite one another.

6. A threaded connection device as claimed in claim 1:

wherein said cylindrical sleeve further includes a second fastener at a second end to which a second flexible pipe is attached and a second external thread adjacent said second fastener;

further including a second ring for the second end of said sleeve, said second ring including a second circular rim, and a second internal thread for threading said second ring onto the second external thread of said sleeve and over the respective second pipe and said second fastener thereat such that said second circular rim compresses the second pipe against said second fastener; and wherein said second external thread of said sleeve further includes a second thread part having a second thread pitch which is a multiple of a second thread pitch of said second internal thread of said second ring.

7. A threaded connection device for flexible pipes comprising:

a cylindrical sleeve having a respective fastener at each end to which respective flexible pipes are attached and a respective external thread adjacent each respective said fastener;

a respective ring for each respective said fastener of said sleeve, each said ring including a circular rim, and an internal thread for threading said ring onto the respective external thread of said sleeve and over the respective pipe and respective said fastener adjacent thereto such that said circular rim compresses the respective pipe against the respective said fastener; and wherein respective said external threads of said sleeve each further include a respective thread part having a thread pitch which is a multiple of a thread pitch of the respective said internal thread of the respective said ring threaded thereon.

8. A threaded connection device as claimed in claim 7, wherein said thread part of each said external thread of said sleeve has a thread pitch which is double the thread pitch of the respective said internal thread of the respective said ring.

9. A threaded connection device as claimed in claim 7, wherein each said external thread of said sleeve includes: a first threaded portion placed along a helical line and a second threaded portion placed substantially along the helical line, said first threaded portion and said second threaded portion being divided by at least one threadless portion extending along the helical line for an angle of between 1° and 360°.

10. A threaded connection device as claimed in claim 7, wherein each said thread part includes a longitudinal groove therethrough.

11. A threaded connection device as claimed in claim 10, wherein each said thread part includes two longitudinal grooves therethrough which are opposite one another.

* * * * *